United States Patent
Coon

(10) Patent No.: US 8,228,784 B2
(45) Date of Patent: Jul. 24, 2012

(54) CONFIGURABLE BLOCK CDMA SCHEME

(75) Inventor: Justin Coon, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 916 days.

(21) Appl. No.: 11/534,791

(22) Filed: Sep. 25, 2006

(65) Prior Publication Data

US 2007/0140105 A1 Jun. 21, 2007

(30) Foreign Application Priority Data

Dec. 16, 2005 (GB) .................................. 0525641.7

(51) Int. Cl.
*H04J 11/00* (2006.01)

(52) U.S. Cl. ....................................... 370/208; 375/260

(58) Field of Classification Search .................. 370/203, 370/208, 210, 328, 338; 375/260–265
See application file for complete search history.

(56) References Cited

U.S. PATENT DOCUMENTS

| | | | |
|---|---|---|---|
| 6,377,539 B1* | 4/2002 | Kang et al. ..................... 370/209 |
| 2003/0095576 A1* | 5/2003 | Kang et al. ..................... 370/516 |
| 2003/0128674 A1* | 7/2003 | Kong et al. ..................... 370/320 |
| 2005/0243944 A1* | 11/2005 | Suehiro ......................... 375/295 |
| 2005/0254592 A1* | 11/2005 | Naguib et al. ................. 375/267 |
| 2005/0259757 A1* | 11/2005 | Wu et al. ........................ 375/260 |
| 2005/0276341 A1* | 12/2005 | Umashankar ................. 375/260 |
| 2006/0062315 A1* | 3/2006 | Luz et al. ....................... 375/260 |
| 2007/0087689 A1* | 4/2007 | Alles et al. .................... 455/11.1 |
| 2007/0263735 A1* | 11/2007 | Tong et al. ..................... 375/260 |
| 2008/0260060 A1* | 10/2008 | Seo et al. ....................... 375/260 |
| 2008/0291972 A1* | 11/2008 | Chin Po Shin et al. ....... 375/130 |
| 2008/0298483 A1* | 12/2008 | Marchok et al. .............. 375/260 |

\* cited by examiner

*Primary Examiner* — Ricky Ngo
*Assistant Examiner* — Kan Yuen
(74) *Attorney, Agent, or Firm* — Oblon, Spivak, McClelland, Maier & Neustadt, L.L.P.

(57) ABSTRACT

In an apparatus and method for generating a SC-FDMA signal having a sequence of symbols, a signal is generated by spreading blocks of symbols using a spreading code, then applying an inverse discrete Fourier transform (IDFT) to the symbols, followed by rotating the phase of each symbol, and applying a guard interval in the form of a cyclic prefix (CP), such that the spreading code is selected from sequences having a DFT matrix and Hadamard-Walsh sequence, and whereby the difference between the amounts for rotating the phase of adjacent symbols is constant. The spreading may be changed so as to change the data rate for each transmitter.

24 Claims, 4 Drawing Sheets

CONFIGURABLE BLOCK CDMA SCHEME

BACKGROUND OF THE INVENTION

This invention relates to a method of generating a signal for transmission. More particularly it relates to a method of generating a signal for multiple access transmission. It also relates to a method of receiving such a signal.

The invention relates to a block CDMA scheme that is general by nature, but encompasses several special cases, two of which are reduced-complexity multiple access techniques that are related to OFDMA and SC-FDMA.

Code division multiple access (CDMA) is a popular multiple access technique that is used to support multiple users simultaneously in a network. Many variants of CDMA exist, including direct sequence (DS) CDMA, multi-carrier (MC) CDMA, cyclic prefixed (CP) CDMA, and chip interleaved block spread (CIBS) CDMA. In addition to these variations, many receiver architectures are often available for implementation in CDMA systems, such as the well-known RAKE receiver, interference cancellation receivers, and receivers that rely on channel equalisation.

Some CDMA schemes are interference limited; that is to say, as the number of users in the network increases, residual interference caused by each user eventually also increases and eventually cripples the network, thus rendering simultaneous multiple access nearly impossible. This residual interference generally results from the loss of orthogonality amongst users, which primarily occurs when the channel is temporally dispersive.

Several recent developments in block CDMA systems, including so-called 'generalised MC-CDMA' (GMC-CDMA), CIBS-CDMA, single-carrier frequency division multiple access (SC-FDMA) (also known as DFT-spread OFDM), and a throughput-efficient block CDMA system, have led to multi-user interference (MUI) free transmission techniques.

US 2004120274, incorporated herein by reference, discloses CDMA transceiver techniques for wireless communications.

US 2002126740, also incorporated herein by reference, proposes chip-interleaved, block-spread multi-user communication.

An example of a so-called 'generalised MC-CDMA' system is described in "Wireless multicarrier communications", Zhendao Wang, Giannakis, G. B., Signal Processing Magazine, Vol. 17, No. 3, pages 29-48, May 2000, incorporated herein by reference.

Shengli Zhou, Giannakis, G. B., Le Martret, C. describe a system using CIBS-CDMA in: "Chip-interleaved block-spread code division multiple access", IEEE Transactions on Communications, Vol. 50, No. 2, pages 235-248, February 2002, incorporated herein by reference.

Single-carrier frequency division multiple access using DFT-spread OFDM is described in "Performance comparison of distributed FDMA and localised FDMA with frequency hopping for EUTRA uplink," NEC Group and NTT DoCoMo, TSG RAN WG1 Meeting 42 R1-050791, August 2005, incorporated herein by reference, and "A low complexity transmitter structure for OFDM-FDMA uplink systems", D. Galda and H. Rohling, in Proceedings of the IEEE Vehicular Technology Conference (VTC), Vol. 4, pages 1737-1741, May 2002, also incorporated herein by reference.

A throughput-efficient block CDMA system has been proposed by S. Tomasin and F. Tosato: "Throughput Efficient Block-Spreading CDMA: Sequence Design and Performance Comparison" in: Proceedings of the IEEE Global Telecommunications Conference (Globecom), November-December 2005, incorporated herein by reference.

In these systems, any number of users—up to a given maximum number—can theoretically transmit simultaneously without causing any degradation in system performance. However, beyond this maximum number of allowable users, the system becomes interference limited in a similar manner to other CDMA systems.

BRIEF SUMMARY OF THE INVENTION

The invention can be briefly summarised as follows: the proposed method aims to combine the advantages of many of the MUI-free techniques described above, while overcoming their respective disadvantages. In particular, the invention addresses three important special cases: reduced-complexity SC-FDMA, reduced-complexity OFDMA, and self-shift-orthogonal CP-CDMA. These methods are of particular interest since they represent scalable, low-complexity, MUI-free techniques. Furthermore, these techniques can easily be extended to multiple-input multiple-output (MIMO) systems.

As will be seen from the detailed description below, the present invention offers a number of advantages over the known systems. In particular, the present invention supports sub-block precoding and decoding. This flexibility can be used to reduce the peak-to-average power ratio (PAPR) of the transmission or increase the robustness of the transmission (by spreading across the bandwidth and/or introducing redundancy). It is worth noting that the precoding and decoding according to the present invention is not supported by the prior-art systems.

Furthermore, the present invention is highly configurable through the precoders and decoders as will be discussed below. As a result, it is easy, for example, to switch between single-carrier and multi-carrier transmissions by simply including an Inverse Discrete Fourier Transform (IDFT) in the precoder/decoder design.

In a first aspect of the present invention, a method of generating a signal for multiple access transmission comprises spreading blocks of symbols in time or frequency by applying a user-specific spreading code; and applying a guard interval in the form of a cyclic prefix (CP) or zero padding (ZP) to separate different spread blocks, wherein the spreading code is selected from the group comprising orthogonal, mutually shift-orthogonal, and self-shift orthogonal spreading codes.

In one configuration of the above aspect, the user-specific spreading codes are orthogonal and mutually shift-orthogonal.

In another configuration of the above aspect, the user-specific spreading codes are orthogonal but not mutually shift-orthogonal.

In a further configuration of the above aspect, the user-specific spreading codes are mutually shift-orthogonal but not orthogonal.

In yet another configuration of the above aspect, the user-specific spreading codes are orthogonal, mutually shift-orthogonal, and self-shift-orthogonal.

In a configuration of the above aspect, the length of the user-specific spreading codes may change so as to change the data rate for each user.

In a further configuration of the above aspect, precoding is applied to each sub-block of data in a spread block. The precoding may further comprise linear transmit filtering.

In a more particular configuration of the precoding configuration, the step of precoding comprises the step of applying linear transmit filtering.

In another configuration of the above aspect, the step of precoding comprises progressively rotating the phase of each sub-block identically by a user-dependent amount.

In a more particular configuration of the precoding configuration, the step of precoding comprises first applying an inverse discrete Fourier transform (IDFT) to each sub-block and then progressively rotating the phase of each sub-block identically by a user-dependent amount.

In another configuration of the above aspect, a plurality of antennas for transmission are utilised for transmission.

In a further configuration of the above aspect, identical spreading codes are applied to the signals at all transmit antennas for a given user.

In yet another configuration of the above aspect, different spreading codes are applied to any combination of some or all of the signals at various transmit antennas for a given user.

In another aspect of the present invention a method of receiving a signal from multiple access transmission comprises removing the guard interval (CP/ZP); and de-spreading by correlating the received signal with the desired user's spreading code In one configuration of the above aspect, each sub-block of received data in a spread block is decoded.

In another configuration of the above aspect, the phase of each sub-block is identically progressively rotated in phase by a user-dependent amount.

In yet another configuration of the above aspect, a discrete Fourier transform (DFT) is applied to each phase-rotated sub-block.

In a further configuration of the above aspect, a single-tap frequency-domain equaliser is applied to the de-spread data at the output of the filter.

In yet a further configuration of the above aspect, the equalised signal is transformed into the time domain with an IDFT for further processing.

In another aspect of the above aspect, a plurality of antennas are utilised for receiving.

BRIEF DESCRIPTION OF THE SEVERAL VIEWS OF THE DRAWINGS

These and other aspects of the invention will now be further described, by way of example only, with reference to the accompanying figures in which.

DETAILED DESCRIPTION OF THE INVENTION

Figure 1:
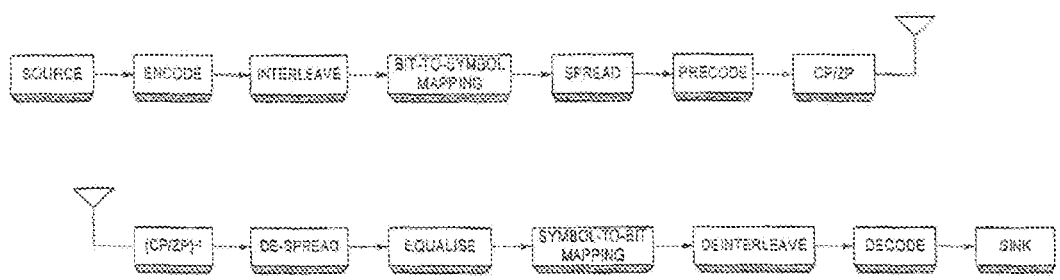
FIG. 1 shows a block diagram of a transmitter/receiver structure according to the invention.

A method of generating a signal for multiple access transmission is disclosed. Also disclosed is a method of receiving a signal from multiple access transmission. In the following description a number of specific details are presented in order to provide a thorough understanding of embodiments of the present invention. It will be apparent, however, to a skilled person in the art that these specific details need not be employed to practice the present invention.

TABLE 1

| MULTIPLE ACCESS TECHNIQUE | PERFORMANCE METRIC | | | | | | |
|---|---|---|---|---|---|---|---|
| | PAPR | COMPLEXITY | MUD REQUIRED? | OVERHEAD | # USERS | INTERFERENCE LIMITED? | USE OF FREQUENCY DIVERSITY |
| DS-CDMA | LOW (+) (MODERATE (o)) | MODERATE (o) | YES[†] (−) | LOW (+) | R (+) | YES (−) | GOOD (+) |
| CP-CDMA | LOW (+) (MODERATE (o)) | MODERATE (o) | YES (−) | MODERATE (o) | R (+) | NO (+) | GOOD (+) |
| CIBS-CDMA | LOW (+) (MODERATE (o)) | LOW (+) | NO (+) | HIGH (−) | R (+) | NO (+) | GOOD (+) |
| SELF-SHIFT-ORTHOGONAL CP-CDMA | LOW (+) (MODERATE (o)) | MODERATE (o) | NO (+) | MODERATE (o) | R/2 (−) | NO (+) | GOOD (+) |
| SC-FDMA | LOW (+) (MODERATE (o)) | MODERATE (o) | NO (+) | MODERATE (o) | R (+) | NO (+) | MODERATE (o) |
| REDUCED COMPLEXITY SC-FDMA | LOW (+) (MODERATE (o)) | LOW (+) | NO (+) | MODERATE (o) | R (+) | NO (+) | MODERATE (o) |
| MC-CDMA | HIGH (−) | MODERATE (o) | YES (−) | MODERATE (o) | R (+) | NO (+) | MODERATE (o) |
| OFDMA | HIGH (−) | MODERATE (o) | NO (+) | MODERATE (o) | R (+) | NO (+) | POOR (−) |
| REDUCED-COMPLEXITY OFDMA | HIGH (−) | LOW (+) | NO (+) | MODERATE (o) | R (+) | NO (+) | POOR (−) |

[†]Although not required, it is beneficial to employ multi-user detection (MUD) on down-link DS-CDMA signals.

A Summary of advantages and disadvantages of various multiple access techniques is shown in Table 1. Entries marked with (+) are desirable, entries marked with (−) are undesirable, and entries marked with (○) are in between. Entries inside brackets correspond to a down-link transmission, and entries without brackets relate to an up-link transmission; if only one value is present in a cell, that value relates to both the up-link and the down-link.

Table 1 gives an overview of the advantages and disadvantages of various multiple access techniques. The three entries entitled 'reduced-complexity SC-FDMA', 'reduced-complexity OFDMA', and 'self-shift-orthogonal CP-CDMA' are three configurations of the present invention. These embodiments will be described in detail below. As observed in this table, the proposed invention can be used to reduce the complexity of the system relative to the known systems which were mentioned above. Alternatively, it can be used to lower the peak-to-average power ratio (PAPR) of a multiple access transmission. In short, the advantages that may be obtained by using the proposed invention are dependent upon the specific embodiment of the invention. However, one advantage that the invention has is that it is easily configurable to all of the specific embodiments as will be described below.

The proposed invention has a general transmitter/receiver structure as illustrated in FIG. 1. Data coming from the source is encoded before it is interleaved and subsequently mapped. Alternatively, one or both of the encoding and interleaving steps may be omitted. The key elements of this structure are the spreading/de-spreading blocks and the precoding block. Before transmitting, a guard interval is applied in the form of a cyclic prefix (CP) or zero padding (ZP) to separate different spread blocks.

Also shown in FIG. 1, the receiver removes the guard interval before de-spreading the received signal. The equaliser block can, in general, represent any single-user, linear or nonlinear, time-domain or frequency-domain equaliser (i.e. linear zero forcing (ZF), linear minimum mean-squared error (MMSE), decision feedback equaliser (DFE), etc.). De-mapped and de-interleaved, the signal is then decoded for outputting to a data sink. Alternatively, one or both of the de-interleaving or decoding steps may be omitted.

Let us first consider the operation of the transmitter. The transmitted message is constructed in the form of a stream of bits that may be encoded and/or interleaved. These bits are mapped to complex baseband symbols that are members of a given constellation, such as M-PSK or M-QAM where M is the number of elements in the constellation. The resulting complex constellation symbols are arranged into groups of N symbols.

Figure 2:
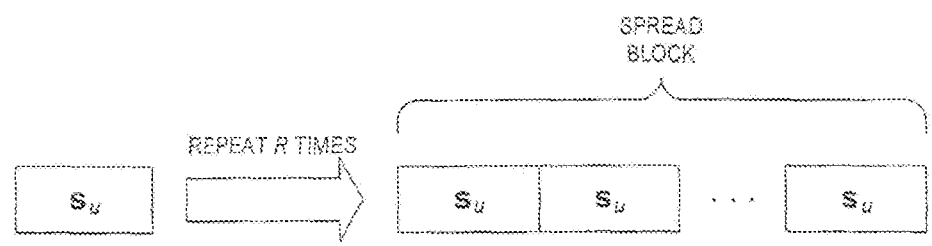
FIG. 2 illustrates the spreading operation.

Let the vector $s_u(i)$ denote the uth user's length-N symbol (column) vector at time i. The spreading operation shown in FIG. 1 performs a simple R-fold repetition on the vector $s_u(i)$, which can be mathematically defined as $$t_u(i) = (1_R \otimes I_N) s_u(i)$$

where $1_R$ is the length-R column vector of ones, $I_N$ is the N×N identity matrix, and $\otimes$ is the Kronecker product operator. This repetition is illustrated in FIG. 2. The skilled person will recognise that this 'block spreading' can be achieved by simple symbol spreading as in a convention DS-CDMA system followed by an appropriate chip interleaver.

Following the spreading operation, a precoding operation is applied to the data vector. This precoder is linear; thus the precoded signal can be represented as $$x_u(i) = \theta_u t_u(i)$$

where $\theta_u$ is the uth user's P'×P (possibly redundant) precoding matrix. Note that P=RN, P'=RN+, N+≧N and P'≧P. If L is the memory order of the channel impulse response, it is important that N'≧L+1 holds true in order to perform low-complexity de-spreading and detection at the receiver.

Following the precoding operation, a cyclic extension is appended to the user's message. This extension takes the form of a cyclic prefix (CP) or zero padding (ZP). It is assumed that the CP/ZP consists of Q≧L symbols so that inter-block interference is mitigated. It is further assumed that the channel remains static for the duration of each individual block. Consequently, the temporal argument i can be omitted from the following discussion without loss of generality.

Figure 3:
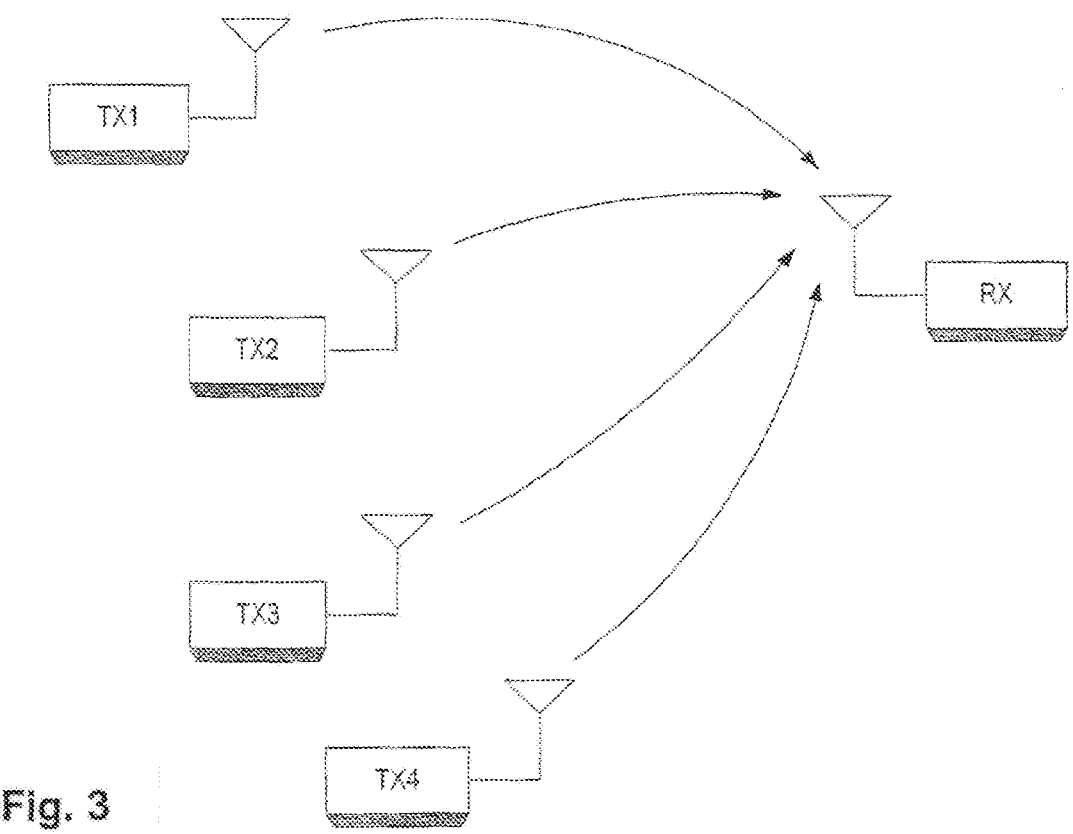
FIG. 3 shows an example of users' signals interfering with each other in the channel and combining at the receiver.

We will now discuss the operation of the receiver. Assuming simultaneous synchronous transmission, the signals from all U users interfere with each other in the channel and are subsequently combined at the receiver as shown in FIG. 3. Thus, the signal at the receiver, after removal of the CP/ZP, can be represented by $$r = \sum_{u=1}^{U} H_u x_u + v$$

$$= \sum_{u=1}^{U} H_u \theta_u (1_R \otimes I_N) s_u + v$$

where $H_u$ is a P'×P' circulant channel matrix describing the impulse response of the channel between the uth user and the receiver and v is a length-P' vector of zero-mean white Gaussian noise samples, each with a variance of $\sigma^2/2$ per dimension.

The received vector r is passed through a de-spreader to separate the desired user's signal from all other users' signals, which gives $$y_u = \Psi_u^H r$$

where $\Psi_u$ is the uth user's P'×N de-spreading matrix. Consequently, the precoding and de-spreading matrices should be designed such that $$y_u = \Psi_u^H H_u \theta_u (1_R \otimes I_N) s_u + \Psi_u^H v$$

for all u. Furthermore, it is desirable from a detection point of view that the modified noise $\Psi_u^H v$ remains white. This design criterion can be summarised as follows:

For MUI-free communication, the preceding and de-spreading matrices should be designed such that $$G(u,u') = \Psi_u^H H_u \theta_u (1_R \otimes I_N) = 0_N, \forall u,u' \text{ such that } u \neq u'$$

and $$\Psi_u^H \Psi_u = c I_N, \forall u$$

where $0_N$ is the N×N matrix of zeros and c is a constant.

Finally, the length-N de-spread symbol vector $y_u$ is passed through an equaliser to recover an estimate of the transmitted data. It is important to note that the de-spread symbol vector $y_u$ ideally does not contain interference from other users. Consequently, any conventional single-user linear or non-linear equaliser can be applied to the de-spread signal.

The following considerations apply to the design of the preceding and de-spreading matrices. It can be shown that the circulant channel matrix $H_u$ can be expressed as $$H_u = I_R \otimes H_{u,0} + J_R \otimes H_{u,1}$$

where $J_R$ is just $I_R$ circularly shifted downward along its columns by one element, and $H^{u,0}$ and $H_{u,1}$ are lower and upper N'×N' Toeplitz matrices that define the channel impulse response. With this representation of the channel matrix, it is intuitive to define the uth user's precoding matrix as follows:

$$\theta_u = C_u \otimes \Lambda_u$$

where $C_u$ is an R×R diagonal spreading code matrix and $\Lambda_u$ is an N'×N sub-block precoding matrix. Similarly, the uth user's de-spreading matrix should be designed as follows:

$$\Psi_u = d_u \otimes \Gamma_u$$

where $d_u$ is an R×1 de-spreading vector and $\Gamma_u$ is an N'×N sub-block decoding matrix. With these definitions, G(u,u') can be written as $$G(u,u') = d_u^H C_u 1_R \otimes \Gamma_u^H H_{u,0} \Lambda_u + d_u^H J_R C_u 1_R \otimes \Gamma_u^H H_{u,1} \Lambda_u$$

which shows that users can be perfectly separated at the receiver through careful design of the spreading codes (i.e. the elements on the diagonal of $C_u$) and the de-spreading vectors $d_u$.

Considering the equation above, the spreading and de-spreading codes can be designed. The expression for G(u,u') given above suggests that in order for users to be perfectly separable at the receiver, the spreading codes for all users must be orthogonal (i.e. $d_u^H C_{u'} 1_R = 0$ for all $u \neq u'$) and mutually shift-orthogonal (i.e. $d_u^H J_R C_{u'} 1_R = 0$ for all $u \neq u'$). Spreading codes that satisfy these criteria include the columns of an R×R DFT matrix, as may be easily verified.

Alternatively, the spreading codes can be defined such that they are orthogonal but not mutually shift-orthogonal. In this case, the sub-block preceding and decoding matrices can be designed such that they lie in the null space of the N'×N' upper triangular matrix $H_{u,1}$ as long as N'−L≧N. For example, if N=2 and N'=5, the uth user's sub-block preceding matrix can be defined as $$\Lambda_u = \begin{pmatrix} \lambda_{1,1} & \lambda_{1,2} \\ \lambda_{2,1} & \lambda_{2,2} \\ 0 & 0 \\ 0 & 0 \\ 0 & 0 \end{pmatrix}$$

or the uth user's sub-block decoding matrix can be defined as $$\Gamma_u = \begin{pmatrix} 0 & 0 \\ 0 & 0 \\ 0 & 0 \\ \lambda_{4,1} & \lambda_{4,2} \\ \lambda_{5,1} & \lambda_{5,2} \end{pmatrix}$$

or both. Note that the important aspect about designing the sub-block precoders/decoders is that the only non-zero entries in the sub-block precoder matrix are confined to the first N rows while the only non-zero entries in the sub-block decoder matrix are confined to the last N rows. The benefit of designing the spreading codes and the precoder/decoder matrices in this fashion is that the design restrictions on the spreading codes are relaxed. As a result, it is possible to use real-valued length-R Hadamard-Walsh sequences as spreading codes instead of complex-valued spreading sequences such as the columns of a DFT matrix. This result has significant implications for systems that use low-resolution digital-to-analogue converters (DACS) and analogue-to-digital converters (ADCs), such as UWB systems (where the DAC/ADC resolution is typically only four or five bits).

An alternative approach to designing the spreading codes is to ensure that the condition of mutual shift-orthogonality between user codes is met while orthogonality is not met. In this case, there will be residual interference regardless of the precoder/decoder design since the matrix $H_{u,0}$ is always full rank and thus has an empty null space. However, multi-user detection (MUD) techniques can still be used to recover the users' messages, although this approach is often computationally complex.

Figure 4:
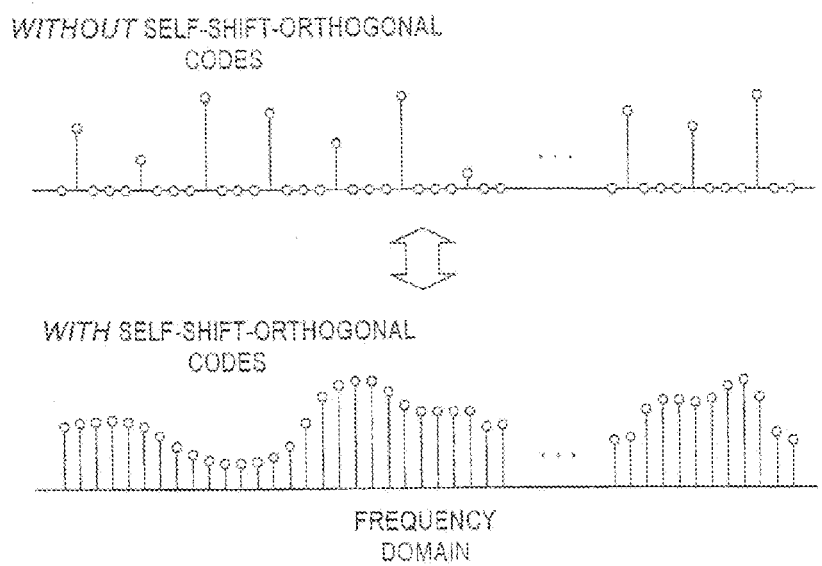
FIG. 4 illustrates bandwidth utilisation when DFT codes are used as spreading codes and when self-shift-orthogonal spreading codes are used.

Finally, the spreading codes can be designed such that they are orthogonal, mutually shift-orthogonal, and self-shift-orthogonal (i.e. $d_u^H J_R C_u 1_R = 0$ for all u). The advantage of taking this approach is that the resulting received, de-spread signal resembles a conventional single-carrier transmission that has passed through a linear time-invariant channel (rather than a circulant channel as has been the case up until now). Techniques such as successive interference cancellation and other conventional time-domain equalisers can be employed with ease given this scenario. Also, the transmitted signal in this case spans the entire bandwidth; thus, the frequency diversity in the channel is maximally exploited. In contrast, when the columns of a DFT matrix are used as spreading codes, the transmitted signal has an FDMA-like structure. This result is illustrated in FIG. 4, which depicts bandwidth utilisation when DFT codes are used as spreading codes and when self-shift-orthogonal spreading codes are used. Defining $c_u = C_u 1_R$, an example of sequences with these orthogonality properties is given below:

$$c_1 = \begin{pmatrix} 1 \\ -1 \\ -1 \\ -1 \end{pmatrix}, \quad c_2 = \begin{pmatrix} -1 \\ -1 \\ 1 \\ -1 \end{pmatrix}.$$

The codes given in this example can support two users simultaneously. It is important to note that the extra degree of freedom that is required to impose the self-shift-orthogonality condition on the sequences causes a reduction in the number of users that can be supported simultaneously in a network (by half).

The data rate is adapted by altering the length of the spreading codes. It is easy to see from the discussion above that the data rate of a user can be changed simply by altering the spreading factor R. If this approach were taken, the spreading codes themselves would change. For example, if R decreased from four to two (i.e. an increase in throughput), the spreading code for a given user might change from a length four DFT code to a length two Hadamard-Walsh code. The skilled engineer will recognise that there are an infinite number of possible alterations to the spreading codes and the spreading factor.

In the following, we will consider the phase-rotating precoder. As discussed above, a linear precoder can be applied to each sub-block prior to transmission. One special case of this precoder might take the form of a non-redundant (i.e. N'=N) length-N phase ramp. In this case, the uth user's sub-block preceding matrix should be designed as $$\Lambda_u = diag\left\{1, e^{j\frac{2\pi}{RN}\gamma_u}, e^{j2\frac{2\pi}{RN}\gamma_u}, \ldots, e^{j(N-1)\frac{2\pi}{RN}\gamma_u}\right\}$$

where diag{ . . . } denotes the diagonal matrix with the elements in the argument on the diagonal and $\gamma_u$ is a user-specific parameter that is an integer in the set {0, 1, . . . , R-1}.

We will now develop the corresponding phase-rotating decoder. As discussed above, a linear decoder can be applied to each received sub-block. One special case of this decoder might take the form of a non-redundant (i.e. N'=N) length-N phase ramp. Typically, this decoder is used when the sub-block precoder is also a phase ramp. In this case, the uth user's sub-block decoding matrix should be equal to the uth user's sub-block preceding matrix, and is given by $$\Gamma_u = diag\left\{1, e^{j\frac{2\pi}{RN}\gamma_u}, e^{j2\frac{2\pi}{RN}\gamma_u}, \ldots, e^{j(N-1)\frac{2\pi}{RN}\gamma_u}\right\}.$$

Turning now to the IDFT/Phase-Rotating Precoder, it is worth noting that in addition to applying a phase rotation, the precoder can be designed to include the IDFT operation. In this special case, the precoder might take the form of a non-redundant (i.e. N'=N) N-point IDFT followed by a length-N phase ramp. Thus, the uth user's sub-block precoding matrix should be designed as $$\Lambda_u = diag\left\{1, e^{j\frac{2\pi}{RN}\gamma_u}, e^{j2\frac{2\pi}{RN}\gamma_u}, \ldots, e^{j(N-1)\frac{2\pi}{RN}\gamma_u}\right\}F_N^H$$

where $F_N$ is the N×N DFT matrix and $\gamma_u$ is a user-specific parameter that is an integer in the set $\{0,1,\ldots,-1\}$.

Let us now consider the DFT/phase-rotating decoder. Although the sub-block decoding matrix comprises an IDFT, the actual application of the sub-block decoder involves the conjugate-transpose of this matrix, which results in the application of a DFT. The uth user's sub-block decoder can be designed to include the DFT operation. In this special case, the decoding matrix might take the form of a non-redundant (i.e. N'=N) N-point IDFT followed by a length-N phase ramp. Typically, this decoder is used when the sub-block precoder is a phase ramp or an IDFT followed by a phase ramp as discussed above. This decoding matrix is given by $$\Gamma_u = diag\left\{1, e^{j\frac{2\pi}{RN}\gamma_u}, e^{j2\frac{2\pi}{RN}\gamma_u}, \ldots, e^{j(N-1)\frac{2\pi}{RN}\gamma_u}\right\}F_N^H.$$

A single-tap equaliser is applied to the de-spread, decoded message. When the sub-block decoder includes a DFT operation as specified above, a single-tap frequency-domain equaliser can be employed to remove distortion from the decoded message. This equaliser can be designed according to any number of criteria that can be found in the literature, such as zero forcing (ZF), minimum mean-squared error (MMSE), decision feedback, etc. When the sub-block precoding matrix does not perform the IDFT on each transmitted sub-block (i.e. the transmitted message is defined in the time domain as with single-carrier transmissions), the equalised frequency-domain message at the receiver should be transformed back into the time domain with an N-point IDFT for further processing, such as channel decoding and symbol mapping.

Figure 5:
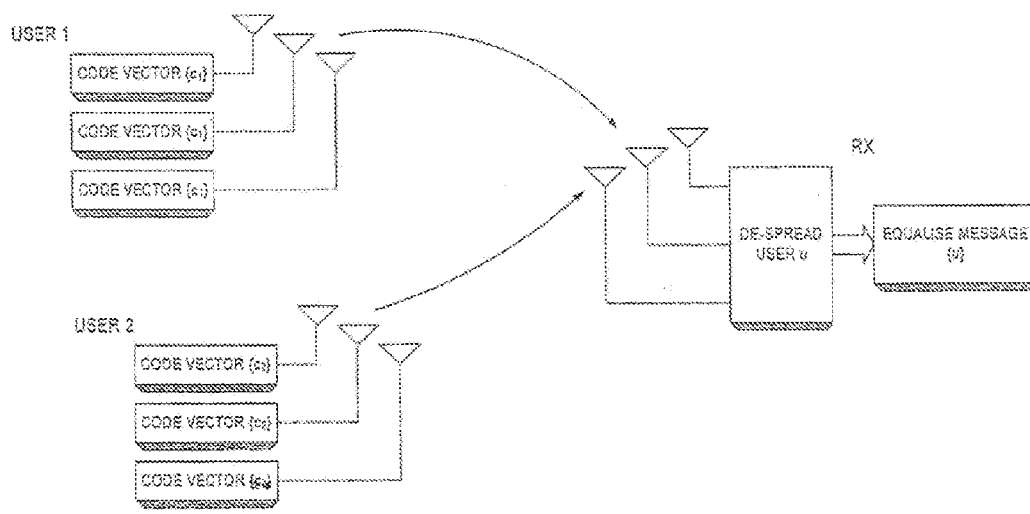
FIG. 5 illustrates user separation and subsequent MIMO detection.

In the following, the use of multiple transmit and/or receive antennas is considered. When multiple transmit antennas are employed, the techniques described above can be applied at each of the antennas. In particular, different spreading codes can be applied to any subset of the messages at the different transmit antennas for a single user. For example, the same spreading code can be applied to the messages at all transmit antennas, in which case the receiver can de-spread the received signal to recover the desired user's multi-antenna transmission. This case is illustrated in FIG. 5 depicting user separation and subsequent MIMO detection. It is observed that the well-studied multiple-input multiple-output (MIMO) detection problem remains after the de-spreading process is complete.

Figure 6:
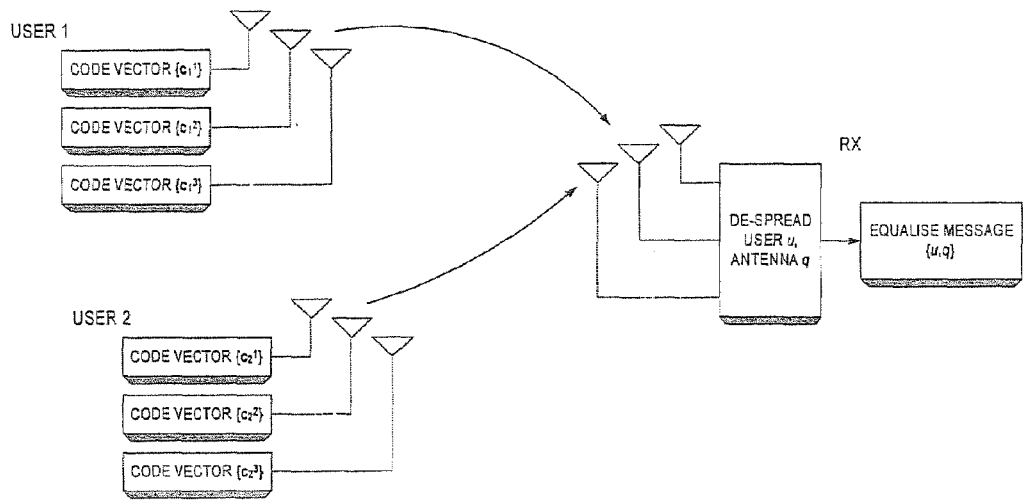
FIG. 6 shows joint user and multiple stream separation.

Alternatively, a different spreading code can be applied at each transmit antenna for a single user. In this case, the receiver is able to separate all users as well as a single user's messages that were transmitted from the various transmit antennas as shown in FIG. 6. Joint user and multiple stream separation is illustrated with the example of user 1 and user 2 simultaneously transmitting streams to receiver RX. In this example each of users 1 and 2 uses three code vectors $\{c_1^1\}$, $\{c_1^2\}$, $\{c_1^3\}$, and $\{c_2^1\}$, $\{c_2^2\}$, $\{c_2^3\}$, respectively for preceding the streams. Upon reception, receiver RX de-spreads the streams from users 1 and 2 received at each antenna q. Eventually, the received message is equalised. If multiple receive antennas are employed, the received message is de-spread for each receive antenna prior to further processing such as MIMO detection.

The present invention described above encompasses at least three special cases which all have their own characteristics. Each of these cases is defined by the spreading code used and the design of the sub-block precoding/decoding matrices. In the following, the advantages of each of these three special cases are summarised.

Figure 7:
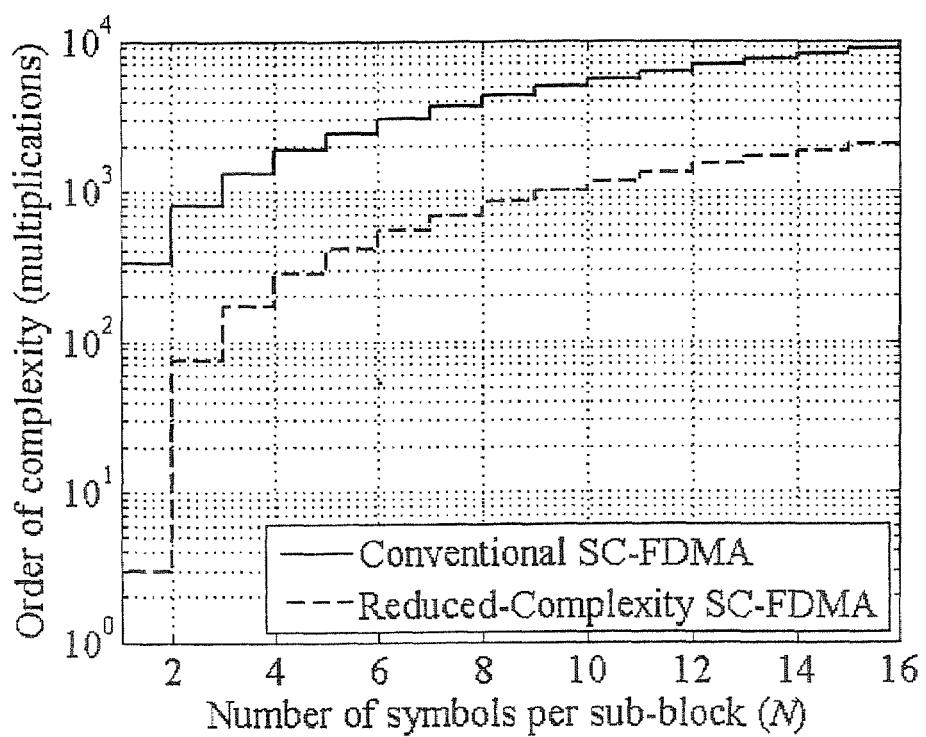
FIG. 7 shows the complexity of frequency-domain equalisation vs. sub-block length for distributed SC-FDMA systems with R=33.

Reduced-Complexity SC-FDMA
Spreading code: columns of a DFT matrix
Sub-block precoding matrix: N×N phase ramp
Sub-block decoding matrix: N×N phase ramp The main advantage of the reduced-complexity SC-FDMA special case is, as the name implies, a reduction in complexity over conventional SC-FDMA systems. This reduction follows from the fact that only an N-point DFT/IDFT is required to perform frequency-domain equalisation as opposed to an RN-point DFT/IDFT, which is used in conventional SC-FDMA techniques. This complexity reduction is illustrated in FIG. 7, displaying the complexity of frequency-domain equalisation versus sub-block length for distributed SC-FDMA systems with R=33.

Reduced-Complexity OFDMA
Spreading code: columns of a DFT matrix
Sub-block precoding matrix: IDFT, N×N phase ramp
Sub-block decoding matrix: IDFT, N×N phase ramp As with reduced-complexity SC-FDMA, the main advantage of the reduced-complexity OFDMA special case is a reduction in complexity over conventional OFDMA systems. This reduction follows from the fact that only an N-point DFT/IDFT is required to perform frequency-domain equalisation as opposed to an RN-point DFT/IDFT, which is used in conventional SC-FDMA techniques. This complexity reduction is illustrated in FIG. 7.

Self-Shift-Orthogonal CP(ZP)-CDMA
Spreading code: self-shift-orthogonal sequences
Sub-block precoding matrix: anything
Sub-block decoding matrix: anything The main advantage of the self-shift-orthogonal method is its efficient exploitation of frequency diversity in the channel. In the two aforementioned special cases, MUI-free transmission is maintained through an FDMA-like transmission structure. This is not the case in self-shift-orthogonal transmissions, which spread the data across the bandwidth as shown in FIG. 4.

Figure 8:
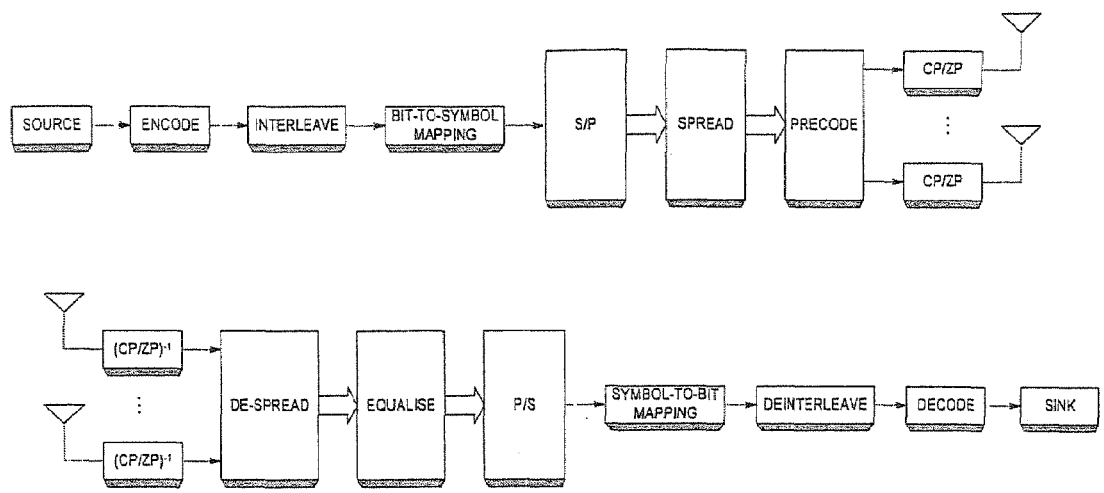
FIG. 8 shows a block diagram of a MIMO system incorporating the invention.

A typical block diagram of a MIMO system incorporating the invention is illustrated for convenience in FIG. 8. Data coming from the source is encoded before it is interleaved and subsequently mapped. Alternatively, one or both of the encoding and interleaving steps may be omitted. The serial data stream is then converted into a number of parallel data streams. The key elements of this structure are again the spreading/de-spreading blocks and the precoding block through which the now parallel streams are passed. Before transmitting, a guard interval is applied to each stream in the form of a cyclic prefix (CP) or zero padding (ZP) to separate different spread blocks.

Also shown in FIG. 8, the receiver removes the guard interval of each stream before de-spreading the received parallel signals. As described earlier, the equaliser block can, in general, represent any single-user, linear or nonlinear, time-domain or frequency-domain equaliser (i.e. linear zero forcing (ZF), linear minimum mean-squared error (MMSE), decision feedback equaliser (DFE), etc.). The parallel streams are then converted into a serial data stream. De-mapped and de-interleaved, the signal is decoded for outputting to a data sink. Alternatively, one or both of the interleaving or decoding steps may be omitted.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A method of generating a single-carrier frequency division multiple access (SC-FDMA) signal comprising a sequence of symbols, the method comprising:
   spreading blocks of symbols by applying a spreading code;
   applying an inverse discrete Fourier transform (IDFT) to the symbols;
   rotating a phase of each symbol by transmitter-dependent amounts; and
   applying a guard interval in the form of a cyclic prefix (CP), wherein the spreading code is one selected from sequences comprising a DFT matrix and Hadamard-Walsh sequences, and
   a first difference between the amounts of phase rotations of a first pair of adjacent symbols is the same as a second difference between the amounts of phase rotations of a second pair of adjacent symbols.

2. The method according to claim 1, wherein a length of the spreading code is changed so as to change a data rate for each transmitter.

3. The method according to claim 1, further comprising:
   utilizing a plurality of antennas for transmission.

4. A method of generating a single-carrier frequency division multiple access (SC-FDMA) signal comprising a sequence of symbols, the method comprising:
   spreading blocks of symbols by applying a spreading code;
   applying an inverse discrete Fourier transform (IDFT) to the symbols;
   rotating a phase of each symbol; and
   applying a guard interval in the form of a cyclic prefix (CP), wherein
   the spreading code is one selected from sequences comprising a DFT matrix and Hadamard-Walsh sequences, and
   a first difference between the amounts of phase rotations of a first pair of adjacent symbols is the same as a second difference between the amounts of phase rotations of a second pair of adjacent symbols.

5. The method according to claim 4, wherein a length of the spreading code is changed so as to change the data rate for each transmitter.

6. The method according to claim 4 further comprising:
   utilizing a plurality of antennas for transmission.

7. A method of generating a single-carrier frequency division multiple access (SC-FDMA) signal comprising a sequence of symbols, the method comprising:
   interleaving the symbols;
   mapping the symbols to M-PSK symbols, where M is a number of elements in a constellation;
   spreading blocks of symbols by applying a spreading code;
   applying an inverse discrete Fourier transform (IDFT) to symbols;
   rotating a phase of each symbol; and
   applying a guard interval in the form of a cyclic prefix (CP), wherein
   the spreading code is one selected from sequences comprising a DFT matrix and Hadamard-Walsh sequences, and
   a first difference between the amounts of phase rotations of a first pair of adjacent symbols is the same as a second difference between the amounts of phase rotations of a second pair of adjacent symbols.

8. The method according to claim 7, wherein a length of the spreading code is changed so as to change the data rate for each transmitter.

9. The method according to claim 7, further comprising:
   utilizing a plurality of antennas for transmission.

10. A transmitter for generating a single-carrier frequency division multiple access (SC-FDMA) signal comprising a sequence of symbols, the transmitter comprising:
    a spreading unit configured to spread blocks of symbols by applying a spreading code;
    a transmitting unit configured to apply an inverse discrete Fourier transform (IDFT) to the symbols;
    a rotating unit configured to rotate a phase of each symbol by transmitter-dependent amounts; and
    a guard interval unit configured to apply a guard interval in the form of a cyclic prefix (CP), wherein
    the spreading code is one selected from sequences comprising a DFT matrix and Hadamard-Walsh sequences, and
    a first difference between the amounts of phase rotations of a first pair of adjacent symbols is the same as a second difference between the amounts of phase rotations of a second pair of adjacent symbols.

11. The transmitter according to claim 10, wherein a length of the spreading code is changed so as to change the data rate for each transmitter.

12. The transmitter according to claim 10 further comprising:
    a plurality of antennas for transmission.

13. A transmitter for generating a single-carrier frequency division multiple access (SC-FDMA) signal comprising a sequence of symbols, the transmitter comprising:
    a spreading unit configured to spread blocks of symbols by applying a spreading code;
    a transmitting unit configured to apply an inverse discrete Fourier transform (IDFT) to the symbols;
    a rotating unit configured to rotate a phase of each symbol; and
    a guard interval unit configured to apply a guard interval in the form of a cyclic prefix (CP),
    wherein the spreading code is one selected from sequences comprising a IDFT matrix and Hadamard-Walsh sequences, and
    a first difference between the amounts of phase rotations of a first pair of adjacent symbols is the same as a second difference between the amounts of phase rotations of a second pair of adjacent symbols.

14. The transmitter according to claim 13, wherein a length of the spreading codes is changed so as to change the data rate for each transmitter.

15. The transmitter according to claim 13, further comprising:
    a plurality of antennas for transmission.

16. A transmitter for generating a single-carrier frequency division multiple access (SC-FDMA) signal comprising a sequence of symbols comprising:
    an interleave unit configured to interleave the symbols;
    a mapping unit configured to map the symbols to M-PSK symbols, M being a number of elements in a constellation;

a spreading unit configured to spread blocks of symbols by applying a spreading code:

a transmitting unit configured to apply an inverse discrete Fourier transform (IDFT) to the symbols;

a rotating unit configured to rotate a phase of each symbol by transmitter-dependent amounts; and a guard interval unit configured to apply a guard interval in the form of a cyclic prefix (CP), wherein the spreading code is one selected from sequences comprising a DFT matrix and Hadamard-Walsh sequences, and a first difference between the amounts of phase rotations of a first pair of adjacent symbols is the same as a second difference between the amounts of phase rotations of a second pair of adjacent symbols.

17. The transmitter according to claim 16, wherein a length of the spreading code is changed so as to change the data rate for each transmitter.

18. The transmitter according to claim 16, further comprising:

a plurality of antennas for transmission.

19. A method of generating a single-carrier frequency division multiple access (SC-FDMA) signal comprising a sequence of symbols, the method comprising:

mapping the symbols to M-PSK symbols, M being a number of elements in a constellation;

spreading blocks of symbols by applying a spreading code;

applying an inverse discrete Fourier transform (IDFT) to symbols;

rotating a phase of each symbol by transmitter-dependent amounts; and applying a guard interval in the form of a cyclic prefix (CP), wherein the spreading code is one selected from sequences comprising a DFT matrix and Hadamard-Walsh sequences, and a first difference between the amounts of phase rotations of a first pair of adjacent symbols is the same as a second difference between the amounts of phase rotations of a second pair of adjacent symbols.

20. The method according to claim 19, wherein the length of the user-specific spreading codes may change so as to change the data rate for each transmitter.

21. The method according to claim 19 further comprising:

utilizing a plurality of antennas for transmission.

22. A transmitter for generating a single-carrier frequency division multiple access (SC-FDMA) signal comprising a sequence of symbols comprising;

mapping unit configured to map symbols to M-PSK symbols, M being a number of elements in a constellation;

a spreading unit configured to spread blocks of symbols by applying a spreading code;

a transmitting unit configured to apply an inverse discrete Fourier transform (IDFT) to the symbols;

a rotating unit configured to rotate a phase of each symbol by transmitter-dependent amounts; and a guard interval unit configured to apply a guard interval in the form of a cyclic prefix (CP), wherein the spreading code is one selected from sequences comprising a DFT matrix and Hadamard-Walsh sequences, and a first difference between the amounts of phase rotations of a first pair of adjacent symbols is the same as a second difference between the amounts of phase rotations of a second pair of adjacent symbols.

23. The transmitter according to claim 22, wherein the length of the user-specific spreading codes may change so as to change the data rate for each transmitter.

24. The transmitter according to claim 22 further comprising:

a plurality of antennas for transmission.

* * * * *